WITNESSES
Edwin E. Bassler
James F. Young

INVENTORS
James B. Wallace, William W. Hamilton, Jr.
and Edward A. Pigan
BY
William A. Elchik
ATTORNEY

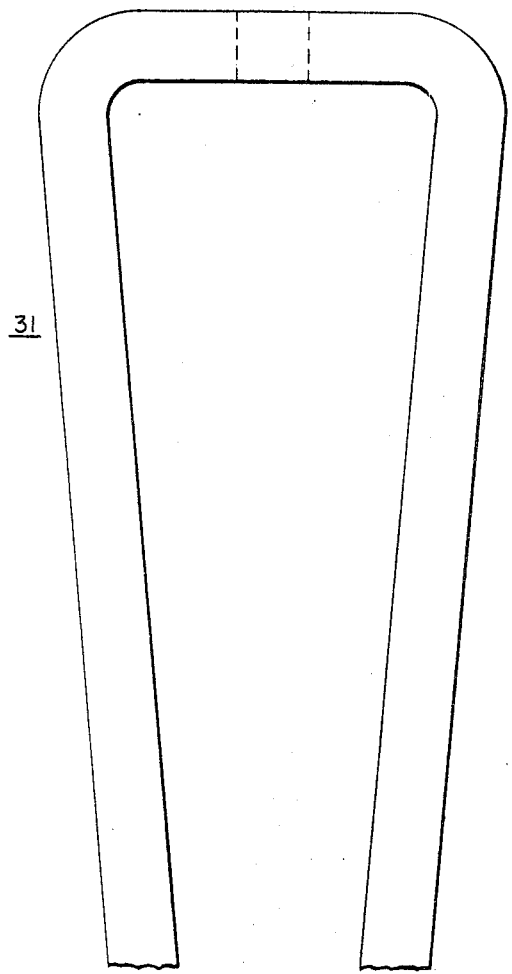
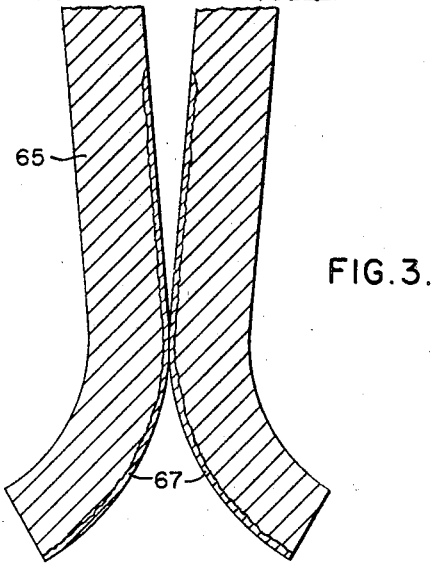
FIG. 3.
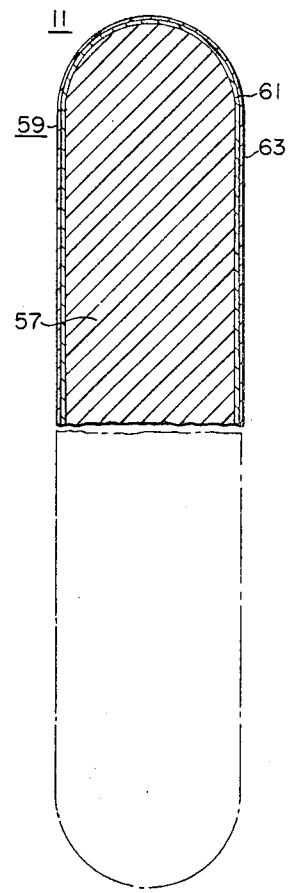
FIG. 4.

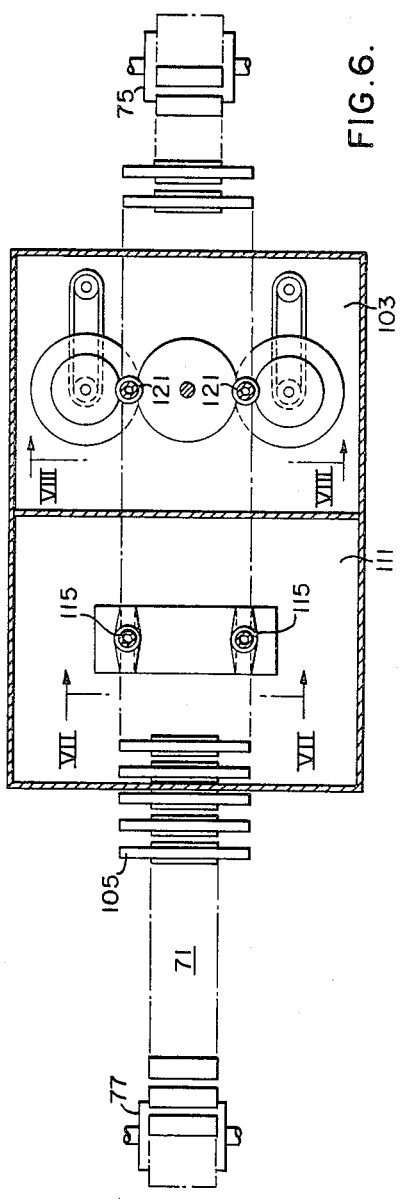
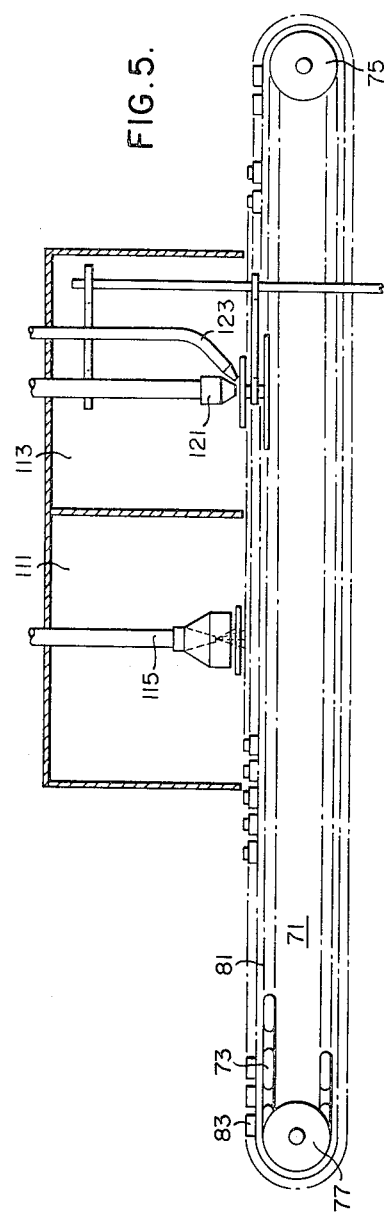

United States Patent Office 3,482,202
Patented Dec. 2, 1969

3,482,202
ELECTRICAL APPARATUS AND SELF-
LUBRICATING CONTACT
James B. Wallace and William W. Hamilton, Jr., Beaver, and Edward A. Pigan, Monroeville, Pa., assignors to Westinghouse Electric Corporation, Pittsburgh, Pa., a corporation of Pennsylvania
Filed Mar. 15, 1967, Ser. No. 623,263
Int. Cl. H01r 13/60
U.S. Cl. 339—22
13 Claims

ABSTRACT OF THE DISCLOSURE

An improved self-lubricating contact structure comprises a main-body part of good conducting material and a self-lubricating contact layer on the main-body part. The self-lubricating contact layer is a composite of a highly conductive metallic component and a solid lubricant component. The self-lubricating contact layer is applied to the main-body part by injecting a mixture of powders of the highly conductive component and the solid lubricant component into a plasma arc and impinging the arc on the main-body part. The self-lubricating contact structure is formed as a plug-in or clip-on type contact structure and mounted on a plug-in unit that is removably connected to a section of bus duct with the contact structure being removably connected to a plated aluminum bus bar.

BRIEF SUMMARY OF THE INVENTION

A plug-in unit comprising a self-lubricating contact structure is mounted on a section of bus duct to tap power off of an aluminum bus bar that is plated with a conducting material in order to prevent exposure of the aluminum to the atmosphere in the contact region. The self-lubricating contact structure comprises a contact surface that is a composite of a highly conductive metallic component and a solid lubricant component. The contact surface that is a composite of a highly conductive metallic component and a solid lubricant component. The contact surface is biased against the plating or layer of conducting material of the bus bar to effectively take power off of the bus bar without abrading through the plating or layer of conducting material. Since aluminum will oxidize when exposed to the atmosphere, and because aluminum oxide is a poor conductor, a more efficient and reliable bus duct system is provided by tapping power off of the plated aluminum bus bar through an improved self-lubricating contact structure. A self-lubricating contact layer is applied to the surface of a conductor by injecting a mixture of a highly conductive metallic powder and a solid lubricant powder into a plasma arc and by impinging the arc on the conductor. The low resistance of the self-lubricating contact layer is achieved by so setting the proportion of the lubricant powder to the highly conductive powder, in relation to their fineness and to the parameters of the plasma arc, that the deposited layer has a small but effective proportion of the lubricant which is adequate to give the contact its low-friction qualities; but is not so thick as to impart appreciable resistance to the transfer of current. In order that the self-lubricating layer be effectively held on the surface of the conductor, the surface of the conductor is roughened by sand or shot blasting before the self-lubricating layer is deposited. It has been found that a thin (.006″ to .008″) self-lubricating contact layer that is a composite of silver and graphite (2 to 4% by weight of graphite and the remainder silver) is highly satisfactory.

An object of this invention is to provide improved bus duct comprising a plated aluminum bus bar and a self-lubricating contact structure connected to the bus bar to tap power off of the bus bar.

Another object of this invention is to provide an improved bus duct plug-in unit comprising a self-lubricating contact structure.

Another object of this invention is to provide an improved contact structure with a self-lubricating contact surface thereon.

A further object of this invention is to provide an improved method for applying a self-lubricating conducting layer on a conductor of a contact structure.

Another object of this invention is to provide an improved method for manufacturing a plug-in type self-lubricating contact structure.

A more general object of this invention is to provide improved bus duct apparatus that is efficient and reliable in operation.

For a better understanding of this invention, together with additional objects and advantages thereof, reference is made to the following description taken in conjunction with the accompanying drawings, in which:

FIG. 3 is an end view, enlarged relative to FIGS. 1 and 2, of one of the contact structures seen in FIGS. 1 and 2 with parts broken away and with part of the contact structure shown in section. A contact layer, that is shown on the contact structure, is enlarged out of proportion in order to better illustrate the invention;

FIG. 4 is an end view, partly in section, of part of one of the bus bars seen in FIGS. 1 and 2 with conducting layers enlarged out of proportion for the purpose of clarity;

FIG. 5 is a side view, partly in elevation and partly in section, illustrating apparatus for practicing the method according to this invention;

FIG. 6 is a plan view, partly in section, of the apparatus seen in FIG. 5;

Figure 1:
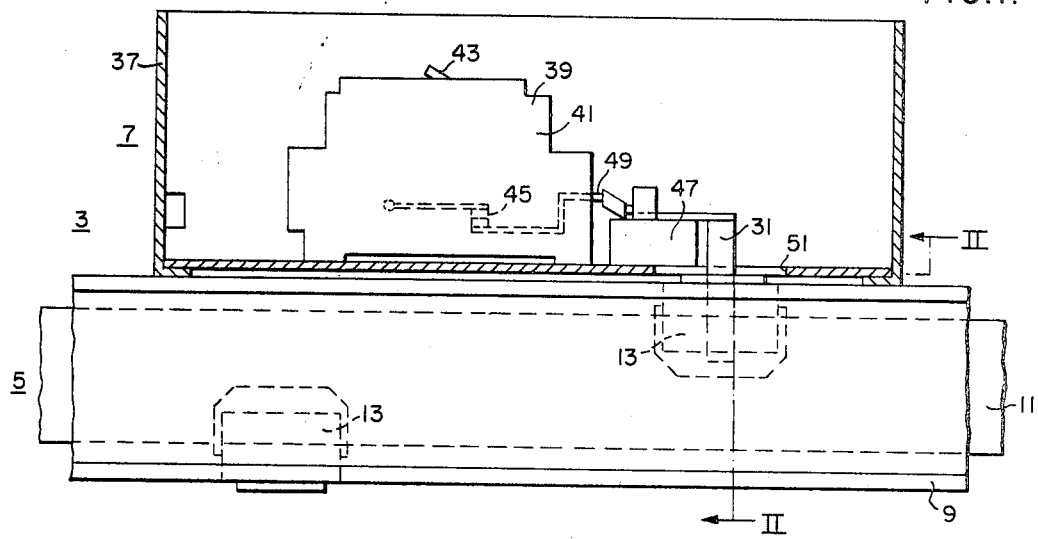
FIGURE 1 is a side view, partly in section and partly in elevation, of part of a bus duct system embodying principles of this invention.
Figure 2:
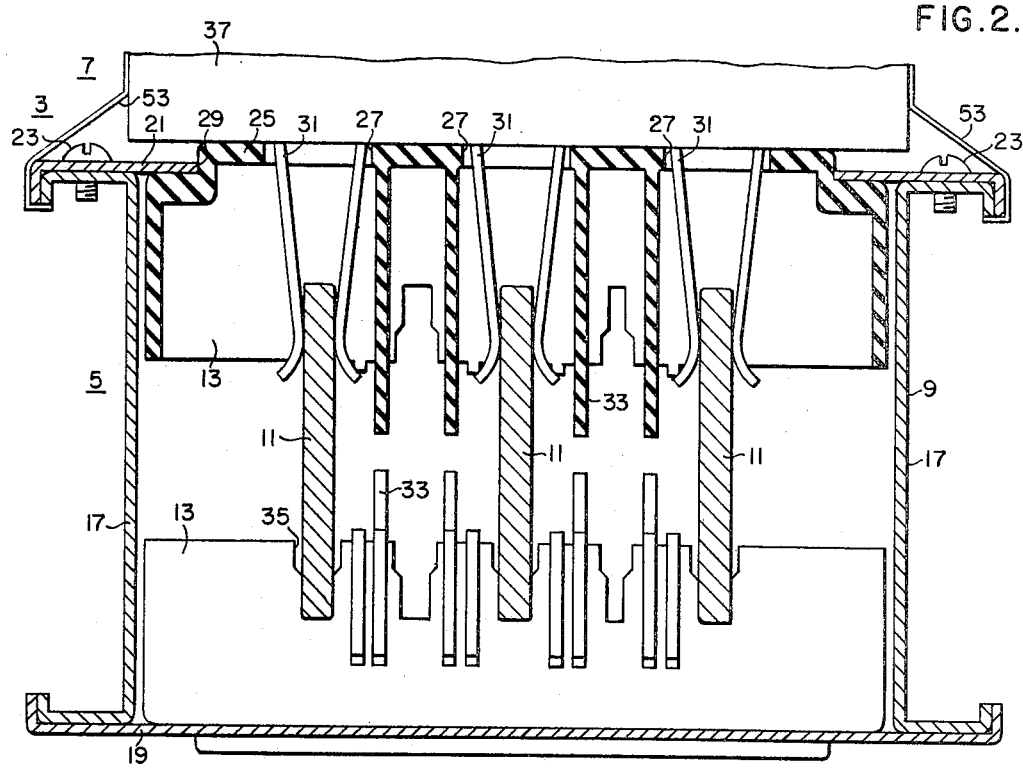
FIG. 2 is a sectional view taken generally along the line II—II of FIG. 1.
Figure 7:
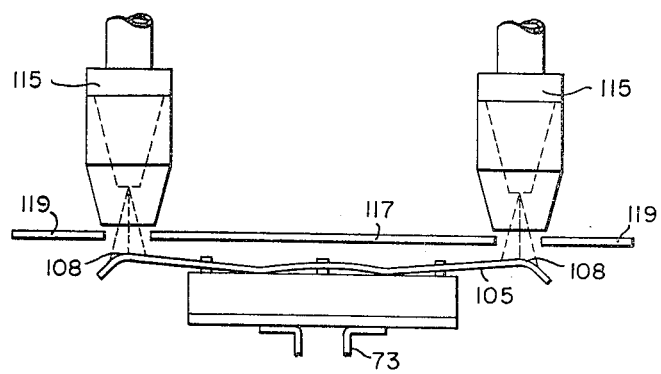
FIG. 7 is an enlarged view in section taken along the line VII—VII of FIG. 6.
Figure 8:
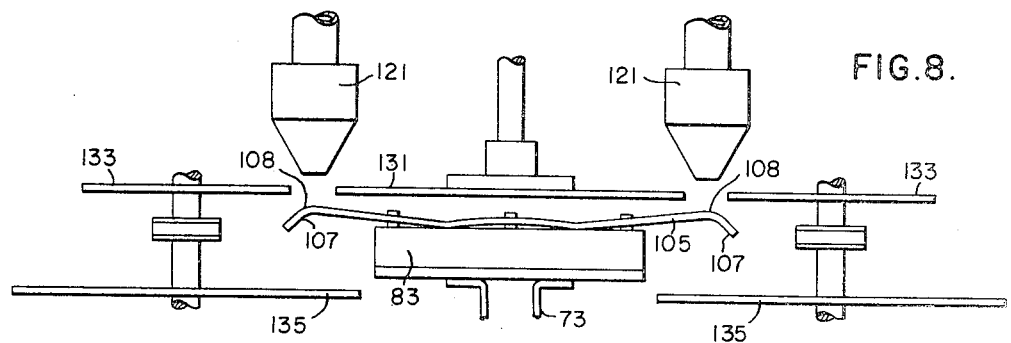
FIG. 8 is an enlarged view in section taken along the line VIII—VIII of FIG. 6.
Figure 9:
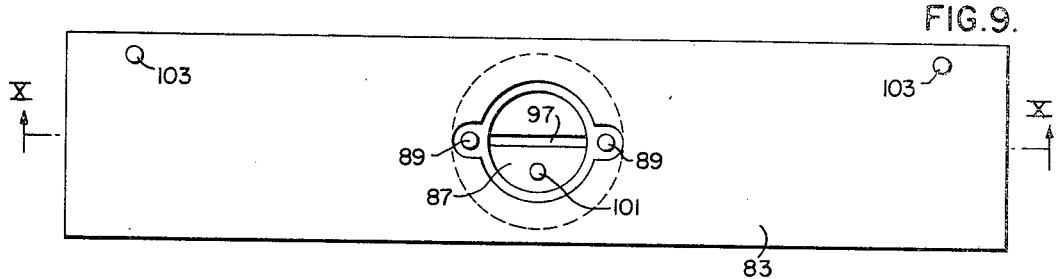
FIG. 9 is an enlarged plan view showing a supporting block of the aparatus shown in FIG. 5.
Figure 10:
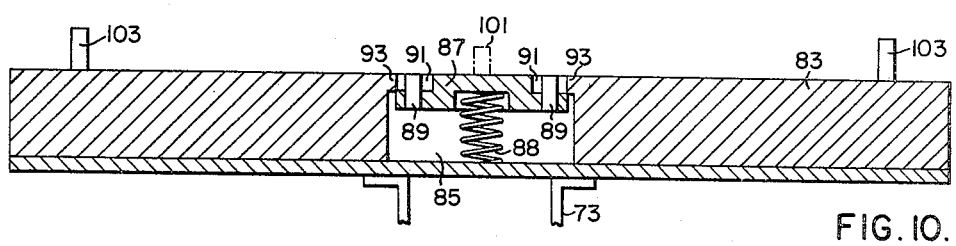
FIG. 10 is a sectional view taken along the line X—X of FIG. 9.

Referring to the drawings, and particularly to FIGS. 1 and 2, there is shown therein bus duct apparatus 3 comprising a section of bus duct 5 and a plug-in unit 7 mounted on the section of bus duct 5. The section of bus duct 5 comprises a housing 9 and three bus bars 11 supported in the housing 9 by means of a plurality of plug-in bus bar support members 13.

The bus duct housing 9 is of the four-channel interlocking type of construction. Two generally channel-shaped parallel members 17 are welded at their lower flanges to a housing member 19, and they are removably fastened at their upper flanges to another housing member 21 by means of screws 23.

The bus bars 11 are supported within the housing 9 between the insulating plug-in bus bar support members 13. In a section of bus duct, there may be a plurality of upper plug-in support members 13 and a plurality of lower insulating plug-in support members 13. Each of the plug-in support members 13 is a one-piece molded insulating member having a raised outer portion 25 that is provided with three openings 27 therein and that extends through an opening 29 in the bust duct housing 9. The three openings 27 are provided for allowing passage of three contact structures 31 into the bus duct housing. As is illustrated in FIG. 2, each of the insulating plug-in support members 13 is hollow except for a plurality of insulating barriers 33 between adjacent contact structures 31. Each of the plug-in support members 13 is open at the inner side thereof, and each of the supports 13 is provided with a plurality of grooves 35 in opposite wall portions thereof for receiving the bus bars 11. As can be seen in FIG. 2, the bus bars 11 fit within the grooves 35 of the oppositely disposed insulating supports 13, and the supports 13 are biased against the opposite wall portions 19, 21 of the housing 9 to thereby support the bus bars 11 in a spaced relationship within the housing 9. The plug-in support members 13 are more specifically described in the patent to James B. Wallace, Patent No. 3,072,736, issued Jan. 8, 1963.

The plug-in unit 7 comprises a metal housing 37 having a removable or openable cover (not shown). A circuit interrupter 39, which may be an automatic circuit breaker or switch, is mounted inside the housing 37. The circuit interrupter 39 comprises an insulating housing 41, having an operating handle 43 extending from the front thereof. The handle 43 is movable between two positions to open and close three pairs of contacts 45 (only one of which pair is shown in broken lines in FIG. 1) in a manner well known in the art. The circuit interrupter may be a circuit breaker of the type described in the patent to E. J. Walker et al., Patent No. 3,103,565 issued Sept., 10, 1963. An insulating support 47 is mounted in the housing 37 opposite one end of the circuit breaker 39, and three plug-in type contact structures 31 are supported on the support 47. A separate conductor 49 electrically connects each of the plug-in contact structures 31 with one of the pairs 45 of contacts within the circuit breaker 39. There are three openings 51 in the base of the housing 37, and each of the contact structures 31 extends through the associated opening 51 and through one of the openings 27 (FIG. 2) in the associated plug-in support 13 to make plug-in or clip-on type contact with one of the bus bars 11. A pair of latches 53 (FIG. 2) are supported on the plug-in unit housing 37 and latched on the bus duct housing 9 to fixedly support the plug-in unit 7 on the section of bus duct 5.

The bus bar 11 comprises an aluminum or aluminum alloy main body part 57 (FIG. 4) and a conducting plating 59 covering the main body part. The main body part 57 is first immersed in a zincate solution to prepare the outer surface thereof and then it is plated with a thin layer of copper 61 and then with a thin layer of silver 63. The conducting plating 59 is provided on the aluminum main body part 57 in order to prevent oxidation of the aluminum. Although the complete bus bar is plated, it is only necessary as a practical matter to plate those areas of the bus bar where connection is made to one of the plug-in contact structures 31 or where connection is made to another bus bar. Aluminum oxide is a poor conductor and it is important to plate or cover the aluminum with a layer of conducting material where connections or contact is made to avoid having the high resistance aluminum oxide in the current path. With aluminum oxide in the current path at a connection or contact, the connection or contact will heat up under operating conditions and cause deterioration of the bus bar and contact structures.

Each of the contact structures 31 comprises a generally U-shaped main body part 65 of a highly conductive resilient material such as cadmium copper, and a self-lubricating contact layer 67 on the inner flat face of each leg thereof in proximity to the free end of the leg. The cadmium copper main body part 65 is formed such that the opposite contact layers 67 are closer together when they are not connected to a bus bar than when they are connected to the bus bar. The thickness of the bus bar is such that when the plug-in contact structure 65 is moved into clip-on contact engagement on the bus bar, the opposite legs are spread apart and the resiliency of the cadmium copper serves to bias the contact surfaces 67 against the opposite generally flat faces of the bus bar. Each of the self-lubricating contact layers 67 is a composite of a highly conductive metallic component and a solid lubricant component. The highly conductive metallic component is preferably selected from the group consisting of silver, silver base alloys, copper and copper base alloys. The solid lubricant component is preferably selected from the group consisting of graphite, molybdenum disulfide, niobium disulfide, niobium diselenide, tantalum disulfide, and titanium ditelluride. A self-lubricating contact layer 67 having a thickness of from .006 to .008 of an inch in dimension and having 97% by weight of the highly conductive component of silver with 3% by weight of the solid lubricant graphite has been found to be highly satisfactory in taking current from a plated aluminum bus bar without abrading through the plating of the bus bar under test conditions that will be hereinafter more specifically described.

The improved contact structures of this invention have particular utility as plug-in type contact structures of bus duct apparatus. In this type of apparatus, the bus duct plug-in sructures include circuit interrupters which can be opened so that the plug-in unit can be moved into and out of the connected position on the bus duct under no-load conditions. Thus, the connections and disconnections are made without subjecting the self-lubricating contact to arcing conditions. The self-lubricating feature of the contact structure is important because the plug-in unit is mounted on the bus duct housing and there is relative movement between the bus bars and the bus duct housing under various operating coinditions. Thus, the bus bars move more relative to the plug-in contact structures, and it is important to prevent abrasion and melting of the plating of the bus bars to prevent exposure of the aluminum bus bars to the atmosphere in the regions where the contact structures are connected to the bus bars.

The apparatus shown in FIGS. 5–10 includes a chain conveyor 71 (FIGS. 5 and 6) including a chain 73 driven by a sprocket wheel 75 and passing over an idler sprocket wheel 77. The wheel 75 is rotated by a motor (not shown).

The chain 73 carries a supporting belt 81 along which are secured a plurality of work or blank supporting blocks 83. Each block 83 has a central opening 85 (FIG. 10) therein within which a plunger 87 is supported on a spring 88. The plunger 87 has pins 89 which, in the raised position of the plunger, engage in openings 91 of a ledge 93 extending over the opening 85. The positioning of the pins 89 in the openings 93 prevents rotation of the plunger 87 once it is set. The plunger 87 has a slot 97 therein so that the plunger may be rotated by engaging a screwdriver in the slot 97 and depressing the plunger so that the pins 89 are disengaged from the parts 93.

A pin 101 extends eccentrically from the head of the plunger. The block 83 has pins 103 near its corner on one side. The blanks 105, from which the contact structures are formed, are strips that are bent over at the ends 107. The strips 105 are held between the pins 101 and 103. The strips 105 may be of two widths. The wider strips 105 are held between the pins 101 and 103 in the position of the plunger 87 shown in FIG. 9. For narrower strips 105 the plunger is turned 180° so that the pin 101 is nearer the pins 103.

The apparatus includes chambers 111 and 113. A pair of guns 115 connected to grid supplies (not shown) extend into chamber 111 in positions to project particles against the flat faces of the blanks 105 at 108 to provide these areas with roughened surfaces. Typically, the guns 115 project particles of aluminum oxide against the faces at 108. The particles are projected through rubber masks 117 and 119 and are collected through a hopper (not shown) and recirculated through the guns 115.

The chamber 113, which includes a pair of plasma-arc guns 121, is connected to a hood (not shown) to vent the gas generated in the plasma. Typically the plasma-arc gun such as 121 includes an anode of tungsten or other suitable material and a constricting or stabilizing nozzle for constricting the arc. The arc preferably utilized in the practice of this invention is of the non-transferred type and such as an arc is produced by impressing a potential between the anode and the nozzle. Gas in substantial quantities is transmitted through the arc and a plasma of the ionized gas passes through the nozzle onto the workpiece at 108. A mixture of powders of the material to be deposited are injected into the arc to produce a composite layer on the workpiece. The individual powders, which make up the mixture, may also be projected into the arc separately from different positions.

Within the scope of this invention the arc may also be of the transferred type, in which the potential which drives the arc is impressed between the anode and the workpiece; it may also be of the dual-arc type in which separate arcs are produced between the anode and the nozzle and between the nozzle and the workpiece, and the powder is injected into the anode nozzle arc near the other arc or between the two arcs.

The guns 121 are positioned to project the plasma on the roughened regions 108 of the strip 105. The powder mixture is supplied through a tube 123 under gas pressure into the plasma where it leaves the gun or into the nozzle adjacent the region where the plasma leaves the gun.

The regions 108 on which the plasma is projected are defined by a disc 131 and discs 133 between each nozzle and the strip 105 and discs 135 below the strip 105. The discs 131 and 133 provide a slot through which the plasma impinges on the workpiece and collect material which does not pass through the slot, and the discs 135 collect material which passes between workpieces. The discs are rotated from the motor (not shown) by operation of the sprocket wheel 75. The material collected on the discs may be scraped off and reused.

In the use of the apparatus the workpieces or blanks 105 are placed on the blocks 83 by an operator positioned near the idler 77 of the conveyor. For positioning, holes are provided in the center of each blank 105 and a pin 101 engages a blank 105 in this hole. The blank 105 is locked in position between the pins 101 and 103 with the plunger 87 in one position or the 180° displaced position depending on the width of the blank.

The conveyor 71 then advances the blanks past the guns 115 where the surfaces at 108 are roughened and then past the guns 121 where the composite layer of lubricant and conductor are deposited. Typically, the layer extends from each end of the blank 105 to a distance of about one inch from the end over the whole width of the blank, and has a depth of .006 inch to .008 inch. A thin layer is desirable because the self-lubricating composite has less conductivity than silver, for example, and because the composite is relatively expensive. After the layer is deposited the strips are bent into generally U-shaped form to form the plug-in or clip-on type contact structures.

Typically, the layers may be deposited with a Metro 2MB plasma torch. The following Table I shows the relationship between the chemical analysis of the layer and the mesh of the powders and their quantities and the parameters of the plasma arc.

TABLE I

| Powder Mix, Percent Lubricant | Mesh $MoS_2$, Gr. | Nozzle | Gun Distance, Inches | Chemical Analysis of Deposited Layer in Percent |
|---|---|---|---|---|
| 20 $MoS_2$ | −325 | E | 4 | 92.8 Ag, 7.2 $MoS_2$. |
| 20 $MoS_2$ | −325 | E | 6 | 95.6 Ag, 4.4 $MoS_2$. |
| 20 $MoS_2$ | −325 | E | 8 | 97.7 Ag, 2.3 $MoS_2$. |
| 20 Graphite | −100+200 | E | 4 | 98.0 Ag, 2 C. |
| 20 Graphite | −100+200 | E | 6 | 98.8 Ag, 1.2 C. |
| 20 Graphite | −100+200 | E | 4 | 95.6 Ag, 4.1 C. |
| 20 Graphite | −100+200 | E | 4 | 96.1 Ag, 3.9 C. |
| 20 Graphite | −100+200 | E | 3 | 96.5 Ag, 3.4 C. |
| 30 Graphite | −100+200 | B | 4 | 94.9 Ag, 5.1 C. |
| 30 Graphite | −325 | B | 4 | 99.5 Ag, 0.5 C. |

The conductor was silver in all cases; fineness −100+200 mesh 67%; −200+270 mesh 22%; −270+325 mesh 4%, −325 mesh 7%. The E nozzle has an opening 7/32 inch in diameter and the B nozzle has a 7/32 inch diameter bore opening into a 9/32 inch diameter bore 1/8 inch long at the plasma exit. In the case of E nozzle the powder is fed below the nozzle exit; in the case of the B nozzle the powder is fed into the 9/32 inch section.

The arc was operated in all cases at 65 volts between the anode and the nozzle and 400 amperes DC current. The gas was a mixture of nitrogen and hydrogen; the nitrogen was supplied at 100 cubic feet per hour and the hydrogen at 10 cubic feet per hour. Both gases were supplied at 60 pounds per square inch regulated pressure. The powder was injected in a nitrogen gas stream flowing at 5 cubic feet per hour. The powder was fluidized by nitrogen flowing at 1½ to 2 cubic feet per hour.

It has been found, in the case of silver graphite mixtures, that unless the powder is mechanically maintained homogeneous, by stirring for example, the heavier metal tends to settle out from the graphite and the resulting deposit becomes leaner in graphite as the deposit operation proceeds.

EXAMPLE A

Contact structure having cadmium copper main body parts and self-lubricating contact layers of 3.9% graphite with the remainder silver as determined by chemical analysis, and rated for 400 amperes RMS AC, were subjected to surges on aluminum bus bars plated with an inner layer of .0003 of an inch of copper and an outer layer of .0001 of an inch of silver.

The surge current was 2800 amperes on phase A and 2840 amperes on phases B and C.

The surges were turned on for 2 seconds and off for 120 seconds; the cycling was continued for 78 hours.

The voltage drop in millivolts across the contacts of the bus bars and contact structures during the surges were as shown in Table II below:

TABLE II

| | Start | After 78 hours |
|---|---|---|
| Phase A | 100 | 52 |
| Phase B | 42 | 75 |
| Phase C | 58 | 95 |

There was no burning or penetration either of the contacts or of the bus bars.

EXAMPLE B

A cadmium copper contact structure having self-lubricating contact layers of 3.4% by weight of graphite and the remainder silver, as determined by chemical analysis, and rated for 400 amperes RMS AC, was subjected to surges of 2800 amperes on an aluminum bus bar plated with an inner layer of .00038 of an inch of copper and an outer layer of .00003 of an inch of silver. The surges were turned on for two seconds and off for 118 seconds. The cycling continued for 24½ hours. At the start of the test, the voltage drop was 66 millivolts across the contacts of the bus bar and contact structure and after 24½ hours, the voltage drop was 46 millivolts across the contacts of the bus bar and contact structure. There was no burning or penetration of the bus bars or of the contacts of the contact structure.

EXAMPLE C

A cadmium copper contact structure having self-lubricating contact layers of from 2 to 3% graphite by weight and the remainder silver, as determined by chemical analysis, was connected to an aluminum bus bar plated with an inner layer of .00022 of an inch of copper and an outer layer of .00006 of an inch of silver and subjected to surges (on for 2 seconds and off for 120 seconds) of 2800 amperes for 1 hour. After 1 hour, the millivolt drop across the contact regions was 80 millivolts and the bus bar and contact structure were not burned. The same test was then continued with surges of 2800 amperes which surges were on for two seconds and off for 120 seconds with the test lasting a total of 16 hours. After 16 hours, the voltage drop across the contact regions was 45 millivolts and the contact structures and bus bar were not burned or penetrated.

EXAMPLE D

This test was conducted in order to compare results between the self-lubricating contact structure of this invention and a standard contact structure. A contact structure constructed in accordance with this invention and comprising a main body conducting part of cadmium copper having self-lubricating contact layers .006 of an inch thick, which self-lubricating contact layers were composed of 2% graphite by weight and the remainder silver, as determined by chemical analysis, was plugged onto an aluminum bus bar having an inner layer of .0003 of an inch copper and an outer layer of .0001 of an inch of silver. The combination was subjected to 840 pulses of 2800 amperes which were on for 2 seconds and off for 2 minutes. The plating of the bus bar was not penetrated at the end of this test.

A standard prior-art type of contact structure comprising a main body part of cadmium copper coated with .0002 of an inch of tin plating was plugged onto an aluminum bus bar having an inner layer of .0003 of an inch of copper and an outer layer of .0001 of an inch of silver. The combination was subjected to 840 pulses of 2800 amperes which were on for 2 seconds and off for 2 minutes. At the end of this test, the plating of the bus bar was melted away exposing the aluminum in the area where the contact structure engaged the bus bar.

EXAMPLE E

The following abrasion test was conducted to compare performance between the improved self-lubricating contact structure of this invention and a standard prior-art type of contact structure. A contact structure comprising a main body part of cadmium copper having self-lubricating contact layers .006 of an inch thick, which contact layers were composed of 1.2% graphite by weight with the remainder being silver, as determined by chemical analysis, was plugged onto an aluminum bus bar having an inner plating of .0003 of an inch of copper and an outer plating of .0001 of an inch of silver. The contact pressure was 20 pounds. The contact structure was subjected to 30,000 back and forth abrasions, and at the completion of this test the bus bar plating was not penetrated.

A standard prior-art type of contact structure comprising a main-body part of cadmium copper with contact layers of .0002 of an inch of tin plating was plugged onto an aluminum bus bar having an inner plating of .0003 of an inch of copper and an outer plating of .0001 of an inch of silver. The contact pressure was 10 pounds. The contact structure was subjected to 950 back and forth abrasions at the end of which time the plating on the bus bar had been penetrated to expose the aluminum at the contact areas.

EXAMPLE F

The results of these comparison tests demonstrate the advantage of the self-lubricating contact structure of this invention over a standard type of prior art contact structure.

A contact structure constructed in accordance with this invention and comprising a main body conducting part of cadmium copper having self-lubricating contact layers composed of approximately 2% to 3% graphite by weight and the remainder silver, as determined by chemical analysis, was plugged onto an aluminum bus bar having an inner layer of .0003 of an inch of copper and an outer of .0001 of an inch of silver. The combination was subjected to surges of 3400 amperes with the surges being turned on for 2 seconds and off for 176 seconds. The cycling continued for 45 hours.

At the start of the test, the voltage drop across the contacts was 68 millivolts, and at the expiration of the 45 hours of testing the voltage drop across the contacts was 64 millivolts. There was no burning or penetration of the bus bars or of the contacts of the contact structure at the expiration of this test.

A standard prior-art type of contact structure comprising a main-body part of cadmium copper coated with .0002 of an inch of tin plating was plugged onto an aluminum bus bar having an inner layer of .0003 of an inch of copper and an outer layer of .0001 of an inch of silver. The combination was subjected to surges of 3,320 amperes which surges were turned on for 2 seconds and off for 176 seconds. The cycling continued for 18 hours. At the beginning of this test, the voltage drop across the contacts was 64 millivolts and at the expiration of the 18 hours of testing the voltage drop across the contacts was 260 millivolts. At the expiration of the 18 hours of testing there was severe burning of the bus bar with the plating being melted away to expose the aluminum at the contact regions.

While preferred embodiments of this invention have been disclosed herein, many modifications thereof are feasible.

We claim as our invention:

1. In combination; a section of bus duct comprising a bus bar; said bus bar comprising a main-body part of a material selected from the group consisting of aluminum and aluminum base alloys; said bus bar comprising a contact part; said contact part comprising a cover of conducing material on said main-body part to prevent exposure of said main-body part to the atmosphere at said contact part; a plug-in unit comprising a contact structure; said contact structure comprising a contact surface; said contact surface being a composite of a highly conductive metallic component and a solid lubricant component; and means supporting said plug-in unit in proximity to said section of bus duct with said contact surface in contact engagement with said contact part.

2. A combination according to claim 1; said section of bus duct comprising a bus duct housing having opening means therein; means supporting said bus bar within said housing with said contact part being positioned in proximity to said opening means; said plug-in unit comprising a support; a circuit interrupter supported on said support; said circuit interrupter comprising a pair of contacts and means operable to open and close said contacts; conducting means connecting said contact surface in electrical series with said contacts; and means supporting said plug-in unit support on said bus duct housing with said contact structure extending through said opening means into said bus duct housing and with said contact surface in said contact engagement with said contact part.

3. A combination according to claim 2; said bus bar comprising a member having a pair of opposite flat faces; said bus bar main-body part having one of said contact parts on each of said opposite flat faces in proximity to said opening means; said contact structure comprising a generally U-shaped member having one of said contact surfaces on the inside face of each leg thereof in proximity to the free end of each leg thereof; said generally U-shaped member being in clip-on engagement with said bus bar with said contact surfaces engaging said contact parts; and resilient means biasing said legs of said generally U-shaped member toward each other to provide contact pressure between said contact surfaces and said contact parts.

4. A combination according to claim 1; said contact surface being a composite of a highly conductive component selected from the group consisting of silver, silver base alloys, copper and copper base alloys, and a solid lubricant component selected from the group consisting of graphite, molybdenum disulfide, niobium disulfide, niobium diselenide, tantalum disulfide and titanium ditelluride.

5. A combination according to claim 3; said generally U-shaped member comprising a main-body part of a highly conductive material selected from the group consisting of copper, copper base alloys, silver, silver base alloys; each of said contact surfaces being part of a contact layer on the associated leg; and each of said contact layers being a composite of a highly conductive component selected from the group consisting of silver, silver base alloys, copper and copper base alloys, and a solid lubricant component selected from the group consisting of graphite, molybdenum disulfide, niobium disulfide, niobium diselenide, tantalum disulfide and titanium ditelluride.

6. A combination according to claim 1; and said contact surface being a composite of 1% to 5% by weight of graphite with the remainder being silver.

7. A combination according to claim 3; each of said bus bar contact parts comprising an outer plating of silver; said generally U-shaped member comprising a main body part of a highly conductive material selected from the group consisting of copper and copper base alloys; each of said contact surfaces being part of a contact layer on the associated leg; and each of said contact layers being a composite of 2% to 4% by weight of graphite with the remainder being silver.

8. A combination according to claim 7; and each of said contact layers being a layer having a thickness of from .006 inch to .008 inch.

9. A contact structure comprising a conducting base part and a contact area, said conducting base part consisting essentially of a highly conductive material, said conducting base part comprising a roughened surface at said contact area, a sprayed-on contact layer sprayed onto said roughened surface of said conducting base part at said contact area, said sprayed-on contact layer being a composite of a highly conductive metallic component and a solid lubricant component.

10. A contact structure according to claim 9, said sprayed-on contact layer having a thickness of less than .01 of an inch.

11. A contact structure according to claim 9, said sprayed-on contact layer being a composite of a highly conductive component selected from the group consisting of silver, silver base alloys, copper and copper base alloys, and a solid lubricant component selected from the group consisting of graphite, molybdenum disulfide, niobium disulfide, niobium diselenide, tantalum disulfide and titanium ditelluride.

12. A contact structure according to claim 9, said sprayed-on contact layer being a composite of from 1% to 5% by weight of graphite with the remainder being silver.

13. A contact structure according to claim 9, said sprayed-on contact layer being a composite of from 2% to 4% by weight of graphite with the remainder being silver, and said contact layer having a thickness of from .005 of an inch to .009 of an inch.

References Cited

UNITED STATES PATENTS

| 2,289,708 | 7/1942 | Jackson | 200—166 |
| 2,417,967 | 3/1947 | Booe | 200—166 |
| 2,539,230 | 1/1951 | Craig | 339—278 X |
| 3,072,736 | 1/1963 | Wallace | 339—22 X |

OTHER REFERENCES

Publication, reprint from the June 1962 issue of Electro-Technology (copyright 1962 by C-M Technical Publications Corp.). Title: "Electrical Contact Materials, Properties and Selection" by Edgar Freudiger, Texas Instruments, Inc.

RICHARD E. MOORE, Primary Examiner

U.S. Cl. X.R.
339—116, 278